United States Patent [19]

Campagna et al.

[11] 4,022,155
[45] May 10, 1977

[54] GLASSWARE COATING APPARATUS

[75] Inventors: Edward R. Campagna; Donald F. Hardy, both of Horseheads; Thomas W. Palmer, III; Barney R. Daugherty, both of Elmira Heights; John R. Letawa, Horseheads, all of N.Y.

[73] Assignee: Dart Industries Inc., Los Angeles, Calif.

[22] Filed: Oct. 16, 1974

[21] Appl. No.: 515,277

Related U.S. Application Data

[62] Division of Ser. No. 232,455, March 7, 1972, Pat. No. 3,856,498.

[52] U.S. Cl. .............................. 118/423; 118/503
[51] Int. Cl.[2] .................... B05C 3/00; B05C 19/02
[58] Field of Search .......................... 118/423–425, 118/500, 503, DIG. 5, 421; 279/1 R, 1 M

[56] References Cited

UNITED STATES PATENTS

| | | | |
|---|---|---|---|
| 1,443,415 | 1/1923 | Jolls | 279/1 M |
| 1,918,136 | 7/1933 | Rosenberg | 266/4 A |
| 2,159,850 | 5/1939 | Haynes | 118/421 |
| 2,946,696 | 7/1960 | Lopenski | 118/504 X |
| 2,953,483 | 9/1960 | Torok | 118/504 X |
| 3,185,131 | 5/1965 | Manning | 118/421 |
| 3,511,626 | 5/1970 | Wynn | 65/25 R X |
| 3,530,825 | 9/1970 | Antonissen | 118/500 X |
| 3,595,109 | 7/1971 | Burroughs et al. | 279/1 X |
| 3,683,849 | 8/1972 | Atchley et al. | 118/50 |
| 3,734,765 | 5/1973 | Russell et al. | 118/423 |
| 3,764,284 | 10/1973 | Rowe | 118/48 X |
| 3,792,681 | 2/1974 | Jones et al. | 118/69 X |

Primary Examiner—Henry S. Jaudon
Attorney, Agent, or Firm—Kenneth J. Hovet; Leigh B. Taylor; Paul R. Wylie

[57] ABSTRACT

Glassware coating apparatus including an oven and fluidized bed arrangement that preheats, dip coats and cures a thermoplastic shatterproof polymer on ware in a continuous fashion. The apparatus, among other things, includes a gripper device adapted to seize a plurality of ware simultaneously and transfer same through the coating stage. Similarly, there are disclosed techniques and apparatus for pre-heating, curing, applying variable coating thicknesses and transferring and lubricating coated ware.

2 Claims, 16 Drawing Figures

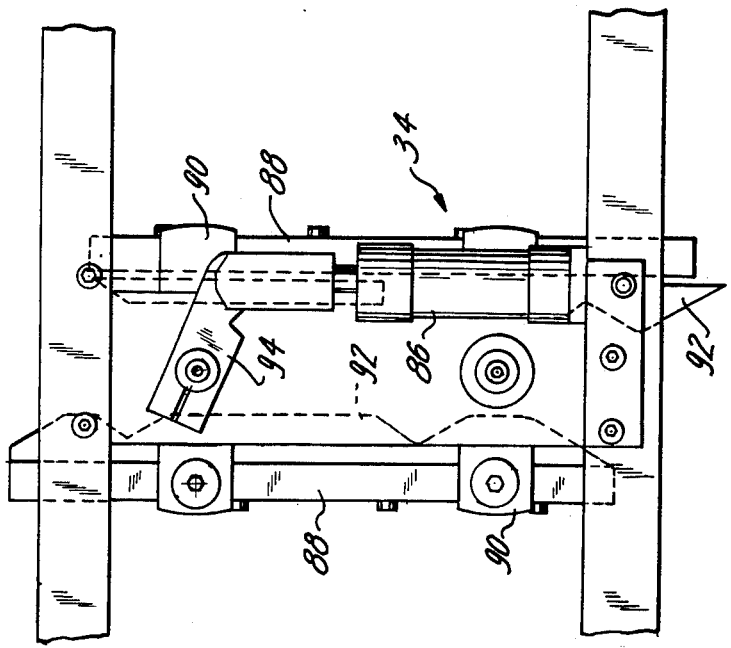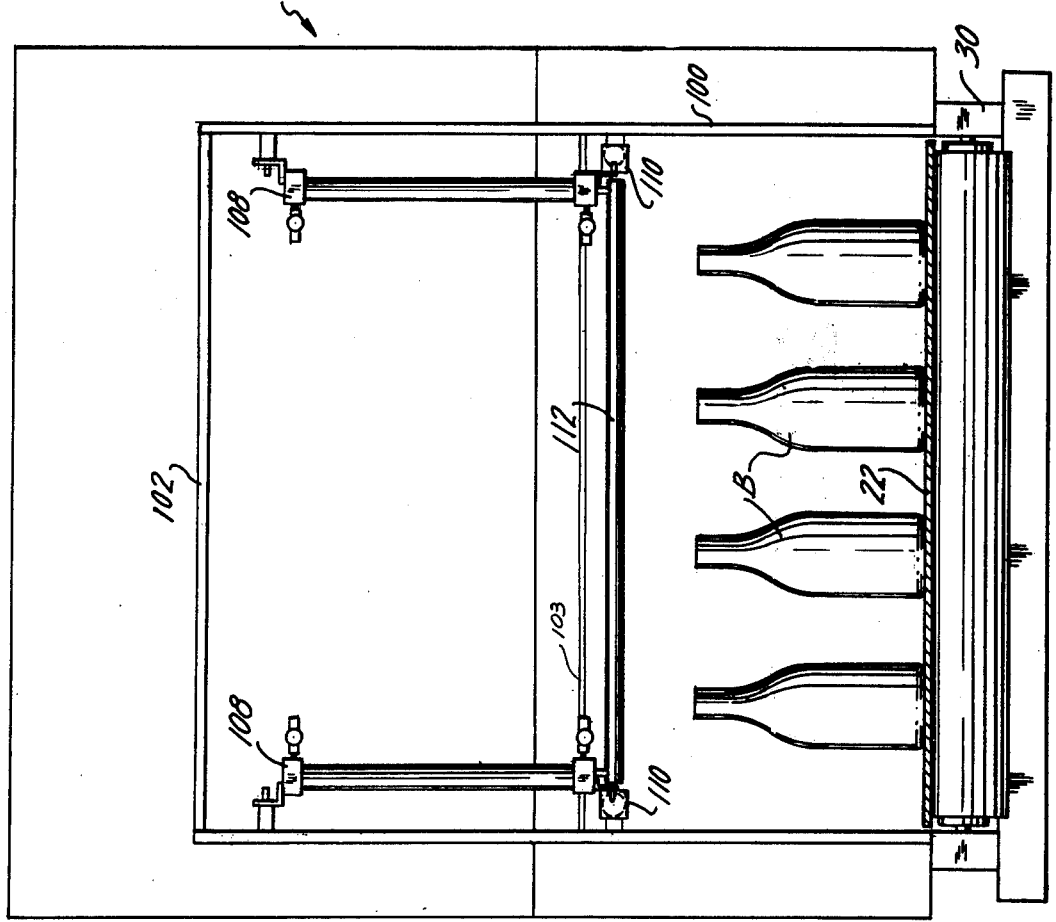

GLASSWARE COATING APPARATUS

This is a division of application Ser. No. 232,455, filed Mar. 7, 1972, now U.S. Pat. No. 3,856,498.

This invention relates to an apparatus for coating articles of manufacture and more particularly concerns the production of shatterproof glassware (i.e., bottleware). In conjunction herewith, developments that might more broadly be characterized as article transfer related are described in combination with conventional fluidized bed apparatus.

It should be understood that prior art polymer coatings and techniques for the application of same to glassware have long been known and practiced by the industry. These coatings have, however, been employed, for the most part, to protect the basic glass construction from surface abrasions and the like. Such abrasions or other defects substantially reduce the inherent glass strength and therefore obviously subject it to have a higher incidence of failure.

The coatings referred to have taken the form of thin protective films bonded to the glass surface and in most respects exhibiting tough but brittle characteristics. These have served well in providing the intended protection and preserving glassware integrity. However, such cannot and do not render ware "shatterproof" or substantially change the fragmentation characteristics of ware that is broken while under internal pressure.

In the latter respect, it should also be recognized that certain glassware, particularly glass aerosol containers, have been provided with polymeric protective sheaths. These are indicated to be resistive to glass fragmentation under conditions of failure but such have been inapplicable for use in the vast majority of glassware applications. For example, most such coatings are of thickness which economically prevent their use of adoption in many fields. Likewise, these have not exhibited criteria which would enable their use in bottling applications where severe cleaning and other processing techniques dictated by the contained product are encountered.

The application here considered has therefore been directed primarily to those containerization areas employing internal pressurization where known aerosol techniques are inapplicable. These are principally considered to be carbonated beverage bottles and the like which, of course, due to their pressurized state, are subject to severe fragmentation in certain instances of failure. In reiteration, it should be understood that the film coatings first mentioned above help in reducing the incidence of failure here discussed but under conditions of failure will not necessarily decrease the severity of fragmentation.

Techniques and apparatus for the application of coatings to containers as are here disclosed establish that certain adhesive characteristics between the glass and polymer envelope dictate the acceptability and applicability for creation of the shatterproof container desired. Similarly, other polymer properties such as elasticity, toughness, etc. contribute to the overall effectiveness of the coating in producing the shatterproof container. Likewise, processing during coating contributes significantly to the creation of a suitably adherent polymer sheath having surface texture continuity and transparency acceptable to the bottling trade.

The invention contemplates use of thermoplastic polymers as the shatterproof coating and particular polyethylene polymers and copolymers such as those described in U.S. Pat. No. 3,859,117 have been found to be quite satisfactory for use in the process. Such are particulate materials preferably having a particle mesh size range of between about 25 and 75 and a low melt index of between about 1 and 3. It should, however, be understood that melt index may be varied slightly from that preferred depending upon material density.

The coating process employing such resins dictates that careful controls on glassware preheat and curing temperatures, immersion times and the like be maintained to assure production of a properly adherent coating. Similarly, in a preferred form the process incorporates a lubrication step or phase wherein a wax composition more fully described hereinafter, is applied to the coatings exterior surface. This treatment tends to increase the slipperiness of that surface, and thereby facilitates bottle handling and movement through various typical bottling apparatus. It is also preferred that the polymer coating be applied to the ware using fluidized bed techniques which, in conjunction with the heating, etc., referred to may be operated as a continuous line, optionally in concert with typical bottle forming machinery.

In addition, particular apparatus developments have also contributed to the success of the overall process and coated shatterproof bottle product. Unique ware transfer mechanisms are employed to present the ware to the coating medium as well as to remove same from the curing oven conveyor. Further, and in conjunction with the transfer mechanism employed during actual particulate polymer, coating, new bottle gripping devices are employed. These are adapted to grip a plurality of heated ware simultaneously, automatically align same prior to gripping if required, and to hold the ware firmly in a steady upright position through all motions of the transfer mechanism.

Hereinabove and throughout the specification and claims reference is made to a thermoplastic shatterproof coating. It should be understood that this terminology is employed in the same sense as would phraseology such as shatter resistant or immune from substantial fragmentation. More particularly, this is a characteristic exhibited by the thermoplastic coated glassware that has been processed in the manner and by apparatus more fully described below. It is apparent therefore that the principal objective of the invention is the production of a shatterproof bottle suitable for use where internal bottle pressurization is anticipated and which by design and definition will substantially minimize bottle fragmentation in the event of such a pressurized bottle failure.

It should also be apparant that other significant advantages offered by coated bottles of this type include, for example, practical elimination of bottle-to-bottle contact abrasions, considerable reduction in bottling and filling line noise, and the use of shipping cartons without partitions. In effect, therefore, bottle ware produced hereby will incorporate the best properties of glass with those of plastic.

Additional objectives and advantages not enumerated will, however, also become more apparent upon continued reference to the specification, claims and drawing wherein:

FIG. 7 is an end elevational view of the article ejector mechanism taken along line 7—7 of FIG. 2;

FIG. 11 is a top plan view of the gripper device shown in FIG. 9;

As indicated above, the development of a shatterproof bottle demands that the polymeric resin employed possess several attributes including: adequate physical properties, feasibility of application to the substrate surface, and favorable environmental qualities. These applied resin coatings ideally are characterized by a high degree of toughness along with the capability of substantial elongation when subjected to sudden or instantaneous loading at both room and refrigeration temperatures. Likewise, to be effective in their performance under filling and breakage conditions, the resin should adhere to the glass substrate. The adhesive characteristic has been found to be of utmost importance if an integral contiguous substrate/polymer coating relationship is to be maintained under hot filling, caustic washing and sterilization conditions. Similarly, under severe strain and upon failure, especially when under internal pressurization, the proper polymer qualities for adherence will assure the retention of glass fragments by the coating. If, however, adhesion is too great in many instances, the coating itself will fragment in a reaction similar to that of the glass substrate, and if insufficient adhesion is achieved once the coating fails (i.e., splits or otherwise opens), glass fragments will be propelled through the opening, out and away from the polymer envelope.

Various polyethylene polymers, copolymers and the like will meet these criteria, however, one that is preferred is a commercially available U.S.I. resin identified as 703-OG containing about 1000 ppm of phenol sulfide as an anti-oxidant. Such should further be characterized by a particle size of between about 25 and 75 and a resin melt index on the order of between 1 and 3. Maintenance of these enables the production of a bottle coating of between 0.006 and 0.012 inch in thickness that possesses the noted physical attributes as well as the desired adhesive qualities. It should be recognized that other polymers may be similarly tailored for use in the process described and that slight variations in melt index may be tolerated depending upon resin density.

Figure 1:
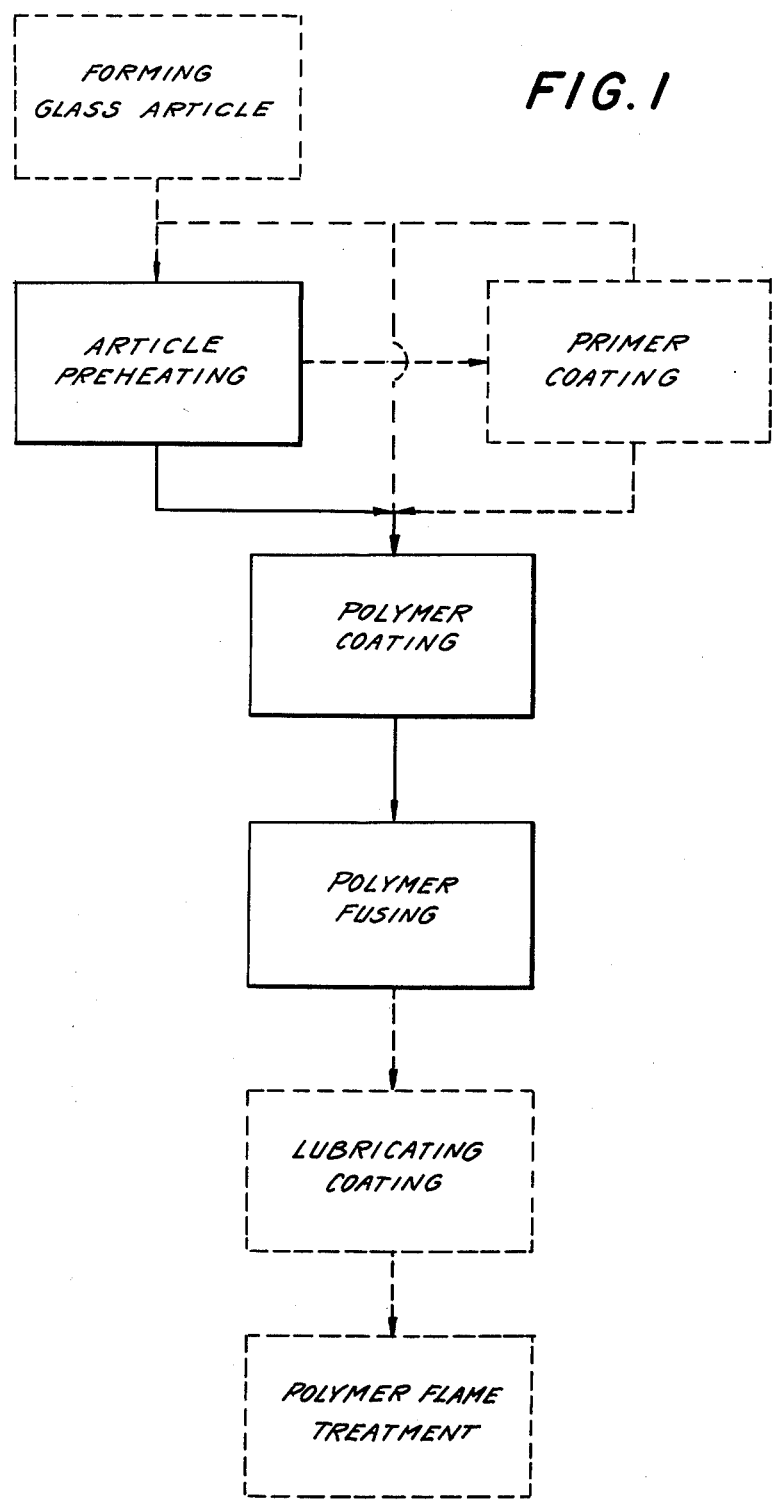
FIG. 1 is a schematic block diagram depicting the process of this invention as well as several alternative variations thereof.

Referring now to FIG. 1, it will become apparent that the basic process steps for the application of this shatterproof coating to bottleware include a preheat cycle, a particulate coating application and a coating curing or fusing procedure. These basic steps as outlined have, of course, been employed in numerous coating applications, however, as applied to the shatterproofing of glassware several specific modifications thereof in the form of specific resin formulations and time/temperature relationships effect the desired end results. Likewise, it should also be apparent that the three basic steps may be expended or incorporated with typical glass forming processes now practiced so that a newly formed bottle may proceed directly to and through the various required coating steps.

Further, in the event certain glass or resin compositions require, a priming step may be employed to achieve the desired degree of adhesion between these components. This, it should, however, be understood, is not contemplated as a required procedure in the preferred form of the invention. Various primers including silicone emulsions and chromic solutions have been found to be effective in improving the bond between resin and glass.

Similarly, subsequent to curing, fusing or sintering the bottle coating, it may be desirable to apply a lubricant to the resin surface. This is, of course, intended to impart a slipperiness to the surface thereby reducing the coefficient of friction of the resinous material and enhancing the flow characteristics of the finished bottles during further handling. Several waxes have been found to be particularly effective and include those having a silicone-wax composition, carnuba waxes and silicones.

It may also be advantageous from time to time to apply glass beads or some other hard smooth pellet-like material to the coated bottom wall bottle surface. These, of course, are embedded in the coating but are exposed so that the bottle is supported thereon. Therefore, the bottle will, in effect on its bottom surface exhibit coefficient of friction characteristics similar to a bare glass bottle and will accordingly respond similarly in typical bottle handling equipment. In addition, it has been found that to effectively label polyethylene coated bottles the resin coating surface should be sensitized by flame treating means. A 1 to 5 second exposure is sufficient and thereafter labels may be applied using any of several glues including jelly-gums, casein glues and acetate adhesives.

Figures 2, 5:
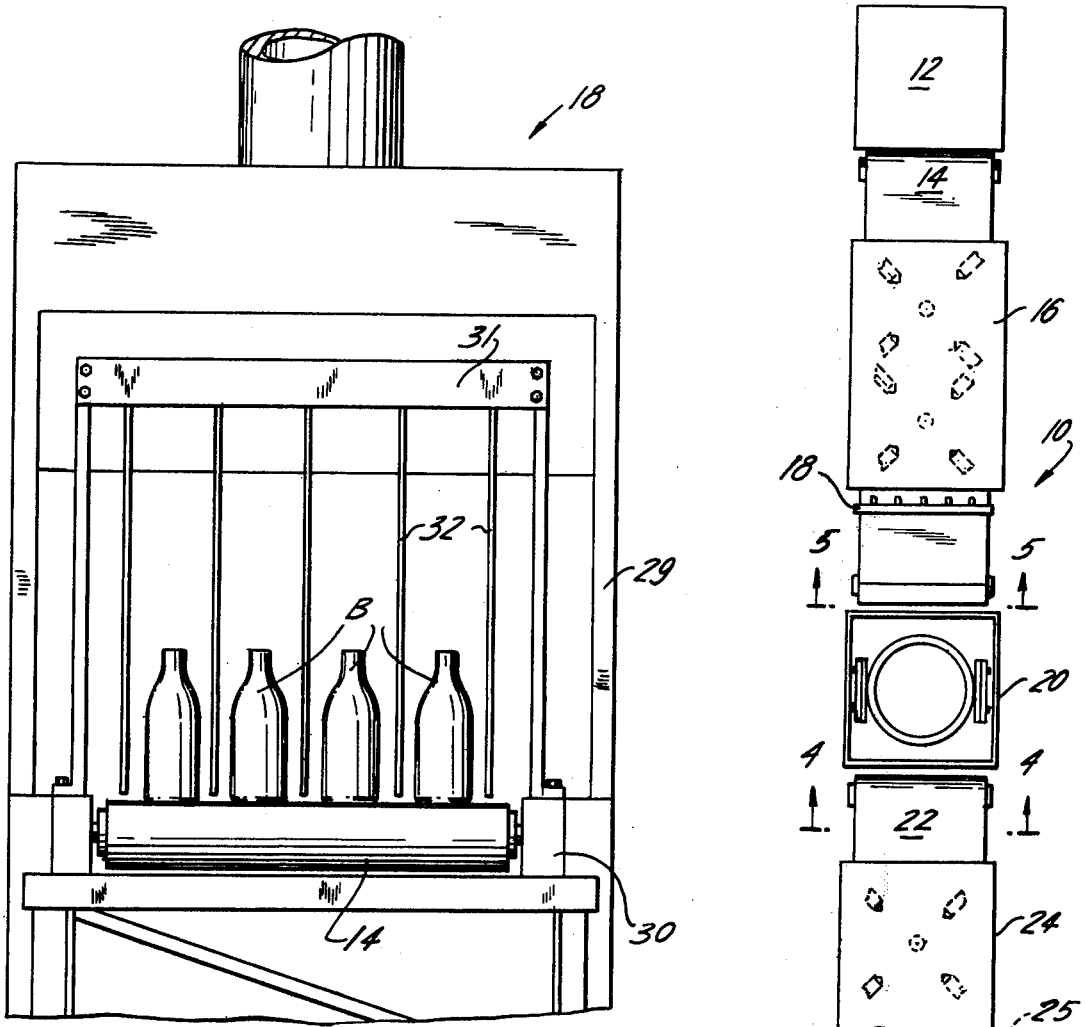
FIG. 2 is a top plan view in schematic form showing a typical apparatus layout anticipated in carrying the invention to fruition.
FIG. 5 is an end elevational view of the bottle registration or alignment mechanism taken along line 5—5 of FIG. 2.

Further clarification of the overall process may be had by referring also to FIG. 2 in the drawings showing an apparatus 10 schematically illustrating the process above described. The ware forming and/or transfer apparatus 12 moves bottles into the shatterproof coating area preferably in a gang arrangement (i.e., bottles abreast of one another across a conveyor width). Even though such arrangement in several showings here have only two or four bottles abreast, the system is adaptable to handle many times that number in accordance with the designer's wishes. In the instant process, the ware, bottles B, move with the preheat wire mesh oven conveyor or conveying assembly 14 into and through the gas fired preheat oven 16. Within this oven the bottles are brought to a relatively uniform temperature of between about 400° and 600° F which can be accomplished with about 12 minutes' exposure from a cold start. It should be appreciated though that various other oven types may require longer or shorter time exposures depending upon type and performance capabilities.

Immediately adjacent the terminal end of preheat oven 16 is a bottle registration grating 18 and the fluidized bed coating apparatus 20. The grating, of course, aligns the bottles along the path of travel of conveyor 14 and thereby prepositions same for engagement by the coating apparatus. This apparatus more fully described hereinafter incorporates a transfer mechanism that grasps the ware as it is moving with conveyor 14, initially moves that ware to a coating position and thereafter transports the coated ware to and deposits same on conveyor assembly 22.

In the preferred embodiment, it is contemplated that the bottle coating will be applied by consecutively dipping plural units of preheated ware into a fluidized bed of particulate resinous material as is above described. It is, however, possible to similarly coat the ware using electrostatic spray methods, solvent systems or the like. When employing the fluidized bed, however, it is imperative that the preheated ware be firmly held in a steady state as they are inserted into the bed so that uniformity of coating can be maintained from bottle to bottle. Further, the dip cycle time for creation of a hole-free contiguous adherent polymer surface of the thicknesses herein specified is between about 2 seconds and 10 seconds. Such, of course, additionally depends upon the bottle preheat conditions, polymer particle size as well as other polymer characteristics and properties. The preferred bottle time in a cold bed is between about 3 and 5 seconds.

The conveyor assembly 22, therefore, has deposited on it hot, exteriorly coated ware that is incompletely fused or sintered. Such conveyor thus passes through a fusing or curing zone or oven 24 (gas fired) which also incorporates a circulating air cooling area or zone 25. Again, it should be appreciated that curing or fusing oven temperatures contribute significantly to the final product characteristics and that 450° to 600° F represents an acceptable temperature gradient. Preferably, however, retention of the coated ware at a 450° to 475° F temperature level for a nominal 8 minute period produces ideal results. This may also vary depending upon oven construction and heat generation means. Particular care should also be taken with this conveyor to assure that it is maintained in as flat an orientation as is possible so that the coated bottle bottoms also retain a flat or planar configuration. At the terminal end of assembly 22 there is located an article ejector 26 which is adapted to transfer the bottles into a single line configuration for passage through lubrication apparatus 28.

A better appreciation of the several apparatus elements above-mentioned, may be obtained by reference to FIGS. 3–15. For example, the bottle registration grating 18 may be seen in more detail in FIG. 5 and it will be recalled that such assures that bottles B will be in proper longitudinal alignment as they approach the coating apparatus. A simple overhead structure including main struts 29 affixed to frame 30 and carrying cross piece 31 and appropriately spaced vertically descending guide rods 32 accomplish this result. As should be apparent, rods 32 will engage any misaligned ware and it in conjunction with the other moving ware, will direct same to a properly aligned position as is shown in FIG. 5. The rods 32, of course may be feathered or otherwise shaped so as to provide a minimum of resistance to the movement of ware there past and similarly it should be obvious that the number of such registration rods will be dictated by the transverse dimension and the transverse utilization of the apparatus.

Also in conjunction therewith, it may be desirable to employ a railroad type gate to assure proper lateral alignment. In one form such a gate can be positioned proximate the forward or downstream edges of guide rods 32 for movement into the path of bottle movement. Thus, in the active or down position ware moving past the noted guide rods will be momentarily restrained until proper lateral alignment of the leading bottle rank is attained. Then, with sequentially time precision the ware is released upon the withdrawal of the gate to an out of the way position. It should also be appreciate that this latter described device may not be required in all apparatus and process embodiments of the invention but can be used to advantage to minimize bottle breakage during processing.

Figure 3:
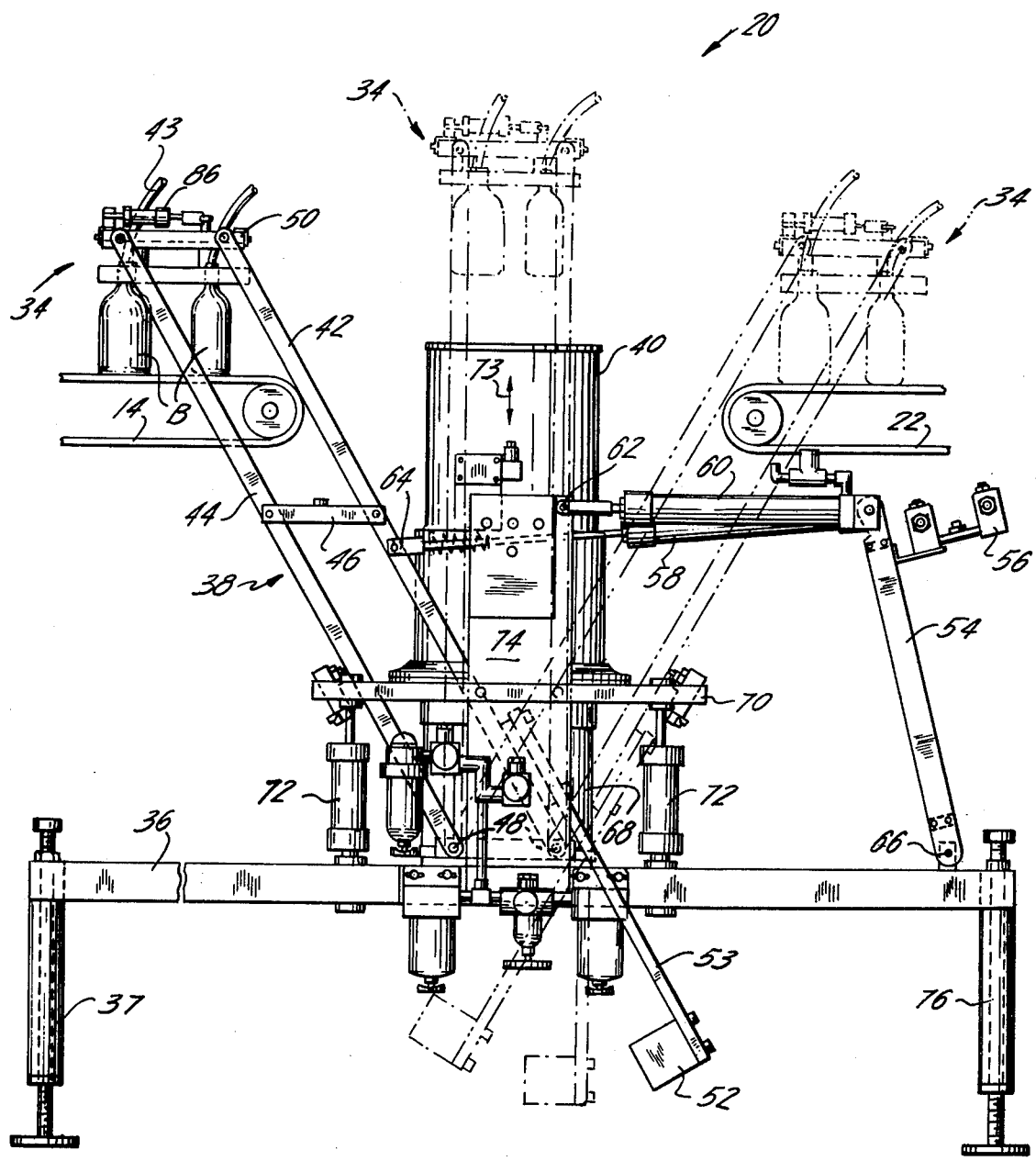
FIG. 3 is a side elevational view of a fluidized bed used to apply the particulate polymer material to the ware and further showing the transfer and gripping apparatus employed therewith.
Figure 4:
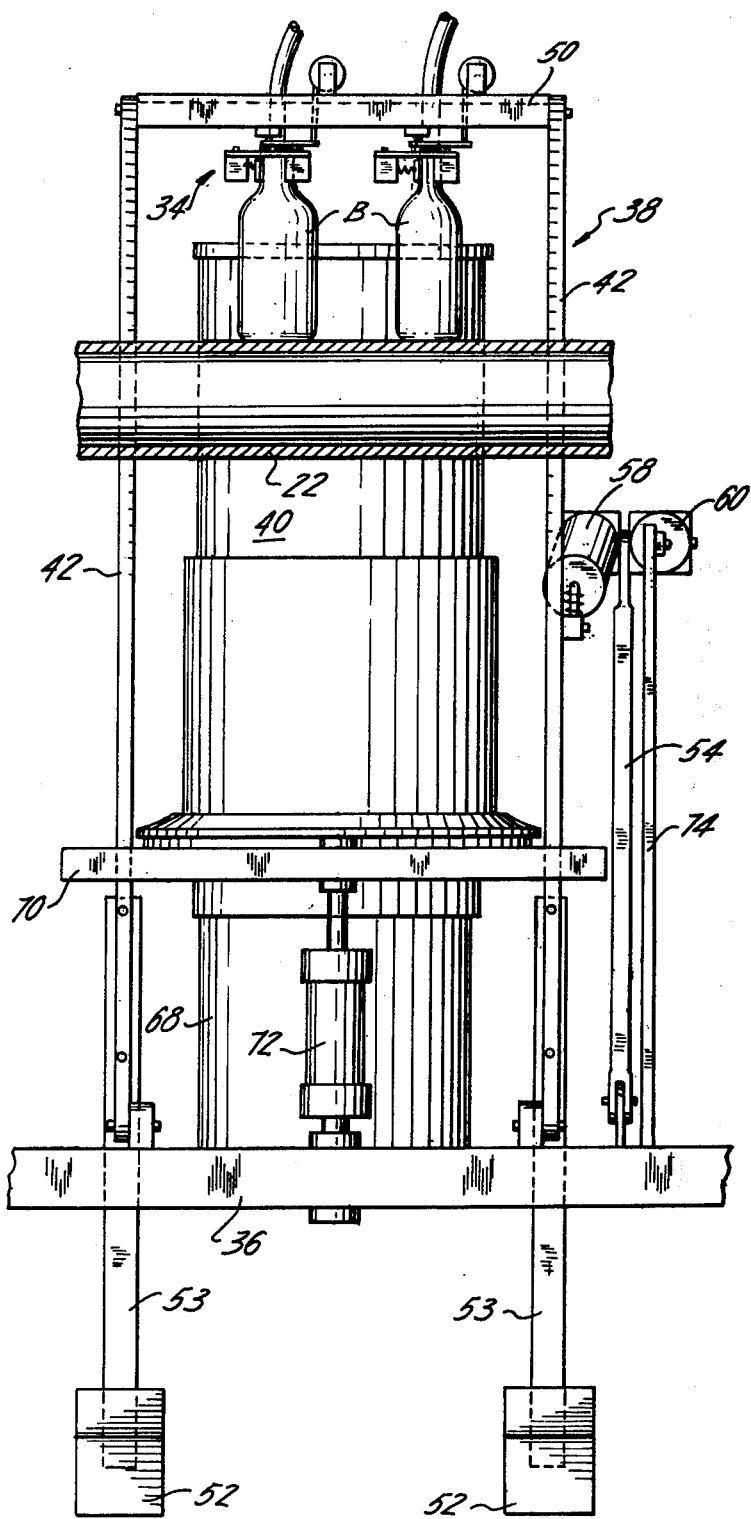
FIG. 4 is an end elevational view of the aforementioned bed, transfer and gripping apparatus taken along line 4—4 of FIG. 2.

Fluidized bed coating apparatus 20 can be more clearly seen upon reference to FIGS. 3 and 4 and as is evident, is supported on a vertically adjustable frame 36 by leveling legs 37. This adjustment, of course, readily enables the apparatus to be adjusted to varying conveyor heights but more particularly, makes the accommodation of various bottle heights an easy one. Two principal bed components are supported on frame 36, those being the transfer mechanism 38 and the fluid bed container 40.

As is readily apparent from these FIGS., transfer mechanism 38 is composed of two pairs of parallelly operable arms 42, 44, one pair pivotally mounted at 48 on each side of the apparatus. The parallelism is maintained therebetween by means of the pivotally mounted cross link member 46 and an overhead beam 50 that extends between the respective arm pairs. This beam is further adapted to mount the various article gripping devices 34 more fully described hereinafter and which actually grasp and steady the ware B during the coating operation as it is transferred from conveyor 14 to conveyor 22.

Note that transfer mechanism 38 is a three position device having counterweights or balances 52 affixed to bars 53 that protrude below the frame and form extensions of arms 42. These weights tend to provide center stabilization for the mechanism and lend a more uniform motion to it during traversal in response to the action of fluid cylinders 58, 60. These cylinders, reacting in accordance with appropriate apparatus control circuitry signals, position the mechanism in each of its three respective positions, one at the bottle pick-up point over conveyor 14, another directly above the fluidized bed container 40 and the last over conveyor 22 where the resin coated ware or bottles are deposited.

Fluid cylinder 58 is attached at one end to lever or rocker support 54 which in turn is pivoted at 66 to frame 36 and is connected to arm 42 as at attachment 64. Upon activation such cylinder 58 will provide the impetus to propel mechanism 38 from its pick-up position to the position above fluidized bed 40. Similarly, fluid cylinder 60 is likewise pivotally attached to lever 54 and to the rigid upright member 74 that extends upwardly from the frame along one side of the apparatus. The activation of this unit (60) will move the mechanism 38 in both directions between the overhead position and the point for deposition of ware on conveyor 22. Rocker support 54, of course, accommodates cylinder movement responsive to their respective driving functions and may also if desired, incorporate counterweights 56 if such are deemed necessary.

Container bed 40 is suspended on support plate 70 by additional fluid cylinders 72 for reciprocatory vertical motion along lower guide cylinder 68 as is shown by arrow 73. It should be apparent that subsequent to the movement of bottles B with mechanism 38 to the overhead position, bed 40 is elevated so that bottles B are immersed in the fluidized particulate resin material contained therein. Likewise, after a suitable immersion time, perferably between about 2 and 10 seconds, as is above mentioned, a suitable coating thickness for effecting the shatterproof characteristics is deposited on the bottles B.

It should be noted at this point that the shatterproof bottle coating is applied over the majority of outside bottle surface area. However, since the bottles are firmly gripped about the finish and a resin free interior must be maintained, the bottle finish and portions of the neck are not coated. Of course, it is desired to coat to the highest possible level on the bottle neck and to leave a uniform parting line at that point of coating departure. Therefore, it is mandatory that a uniform and constant bed top surface level be maintained. To accomplish this, the bed may be intermittently fed a predetermined amount of polymer particle stock after each immersion. Any suitable screw or auger, or belt type feeder may be employed and the point of actual material entry to the bed is optional. Similarly, a suitable measuring means is employed to dispense the proper feed stock amount from a proximately positioned storage container (none of which is shown).

Although the fluidized bed that is here described is movably mounted and reciprocates toward and away from the transfer device and bottles B held thereby to effect bottle immersion in the bed, alternative apparatus may retain the bed in a substantially fixed position and provide an additional vertically disposed reciprocatory motion to the overhead beam 50. This will then permit the positioning of container 40 on flexible mounts so that such can be vibrated between bottle immersions to assist in restoring proper polymer bed top surface conditions. Likewise, with this type of an arrangement, as the ware is withdrawn from the fluidized bed, the beam 50 can be lightly jarred at the conclusion of its upward movement, thus shaking excess, loosely retained polymer particles from the bottle coating surface. This will further minimize the release or loss of such particles during subsequent processing and so will further reduce equipment, air and/or bottle contaminations.

Figure 8:
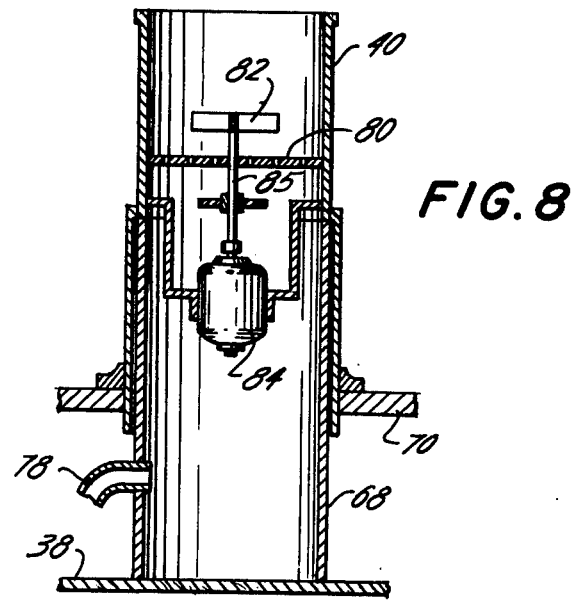
FIG. 8 is a cross-sectional view of a modified fluidized bed having agitating apparatus adapted to vary particulate material density therein.
Figure 9:
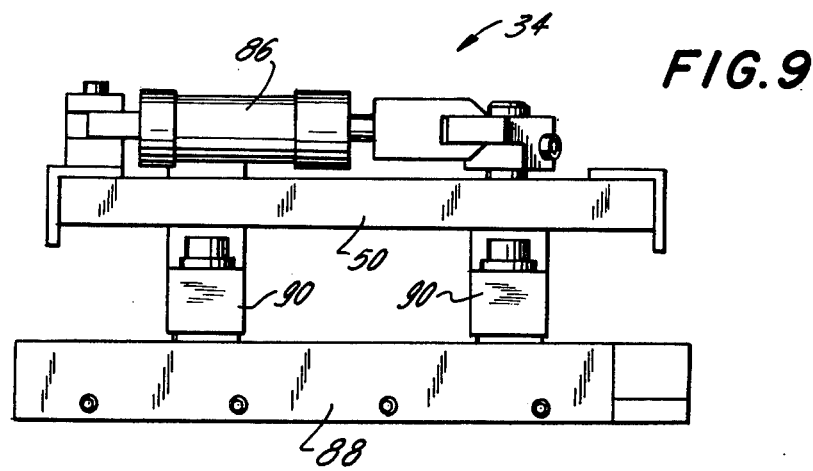
FIG. 9 is a side elevational view of the gripper device for handling ware during the coating thereof.
Figure 10:
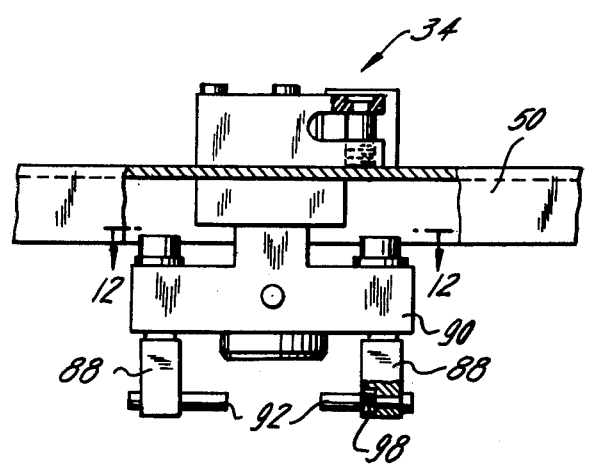
FIG. 10 is an end elevational view of the gripper device partially broken away for purposes of complete illustration.
Figure 12:
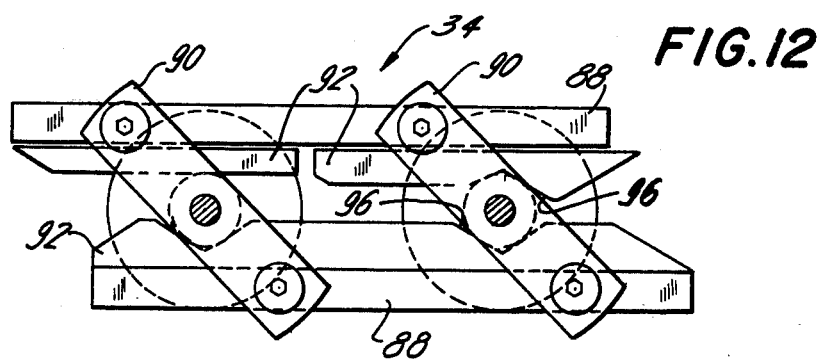
FIG. 12 is a top plan view of the gripper device taken along line 12—12 of FIG. 10 more clearly depicting the gripper element construction.

FIG. 8 shows a modified version of the bed container 40 which includes all of the basic structure above discussed as well as the perforated or porous support plate 80. Such plate, as is critical and common to fluidized beds, retains the particulate resin material in the upper container portion but in operation allows the passage of air therethrough to create the bed proper. Similarly, conduit 78 connects a suitable compressed air source to the lower guide cylinder 68 and ultimately to the underside of plate 80. However, in the modified mechanism disclosed on agitator 82 is positioned within the fluid bed portion of the container and a suitable power means 84 is connected thereto by the drive shaft 85. The power means may be appropriately mounted to the container 40 either interiorly or exteriorly thereof so long as the adaptation thereof does not interfere with bed formation. Also, such agitator apparatus would be positioned at each point of bottle immersion so that all ware would experience common bed conditions.

Digressing briefly, it seems appropriate to at this point, also discuss in detail the article gripping device 34. Such device is of the utmost importance to the invention in that bottles B must be firmly yet gently gripped in a predictable and reliable manner to assure proper coating coverage and uninterrupted machine operation and process continuity. In the preferred arrangement a multiplicity of these devices are mounted on beam 50 of the transfer mechanism as is apparent from FIGS. 9 and 10. This beam also carries the various additional mounts that accommodate fluid cylinder 86 and connectors 90. The connectors pivotally support a dual parallel bar arrangement 88 that, in turn, support gripper elements 92 which actually contact and seize the ware.

Upon activation of cylinder 86, lever arm 94 (FIG. 11) which is rigidly affixed to one of the connectors 90, pivots turning with it that connector. This, depending upon the direction of oscillation, moves the bars 88 and grippers 92 either closer together or farther apart, responsive to the rotation of the connectors 90. Gripper elements 92 will normally be in their open position until the ware becomes properly positioned for seizure. Then fluid cylinder 86 will be activated so as to close the elements and such will remain closed about the ware until it is deposited upon conveyor 22. Multiple gripping devices will, of course, be employed and will be synchronized in operation. Further, as is evident from FIGS. 9–12, it is preferred that each of these devices grasp at least two spaced bottles at a time.

Gripper elements 92 are also uniquely shaped as is characterized by V-notches 96 to accommodate typical bottle finishes. These notches do, however, also render an additional important service by transversely aligning the ware during the closuring thereof should the same be misaligned. Thus, slight bottle misalignment is compensated for without the need of additional apparatus and with minimum bottle breakage. It should also be appreciated that at least one of the gripper element pair 92 should be resiliently mounted as by spring means 98 to the bar 88. This, of course, effects the accommodation of various bottle finish configurations assures the application of a uniform holding pressure and minimizes the shock effect upon the ware as the grippers close about it.

As is also readily apparent from FIGS. 3 and 4, conduits 43 which are in communication with a compressed fluid source, pipe that medium to the bottles held by the gripping device 34 and thereby provide these with a positive internal pressure. This enables the coating thereof without fear of internal bottle surface contamination. It should also be recognized that other suitable ventilation apparatus may be employed over and around the fluidized bed apparatus to reduce to a minimum the resin particulate that becomes airborne in that vicinity.

After the bottles B have been immersed in the container bed 40 to accumulate the desired resin coating thickness, such container retracts or the transfer mechanism otherwise removes the bottles therefrom and thereafter repositions them at the third position or deposit point over the curing oven conveyor 22. Upon reaching this last position, the article gripping device 34 releases the coated ware and it begins its movement with the noted conveyor through oven 24. During the passage therethrough, the particulate resin coating is heated to a molten flowable state to develop a uniform coating and the desired surface texture.

As is above indicated, it is important that the carriage flight of conveyor 22 be retained in as flat a position as is possible so that the soft coated bottle bottoms will also be planar in nature. It should also be apparent that both ovens 16 and 24 may take a variety of forms so long as they are capable of meeting the specified conditions.

Subsequent to the curing or fusing of the resinous coating, it becomes necessary to remove the ware from conveyor 22 and in some instances, this is a more delicate operation than may be fully appreciated. Because the coating on the bottle bottom is during fusion in a semi-fluid condition, such may adhere not only to the bottle ware but also to the conveyor 22. When this occurs, the ware must first be broken away from the conveyor before being transferred therefrom.

Figure 6:
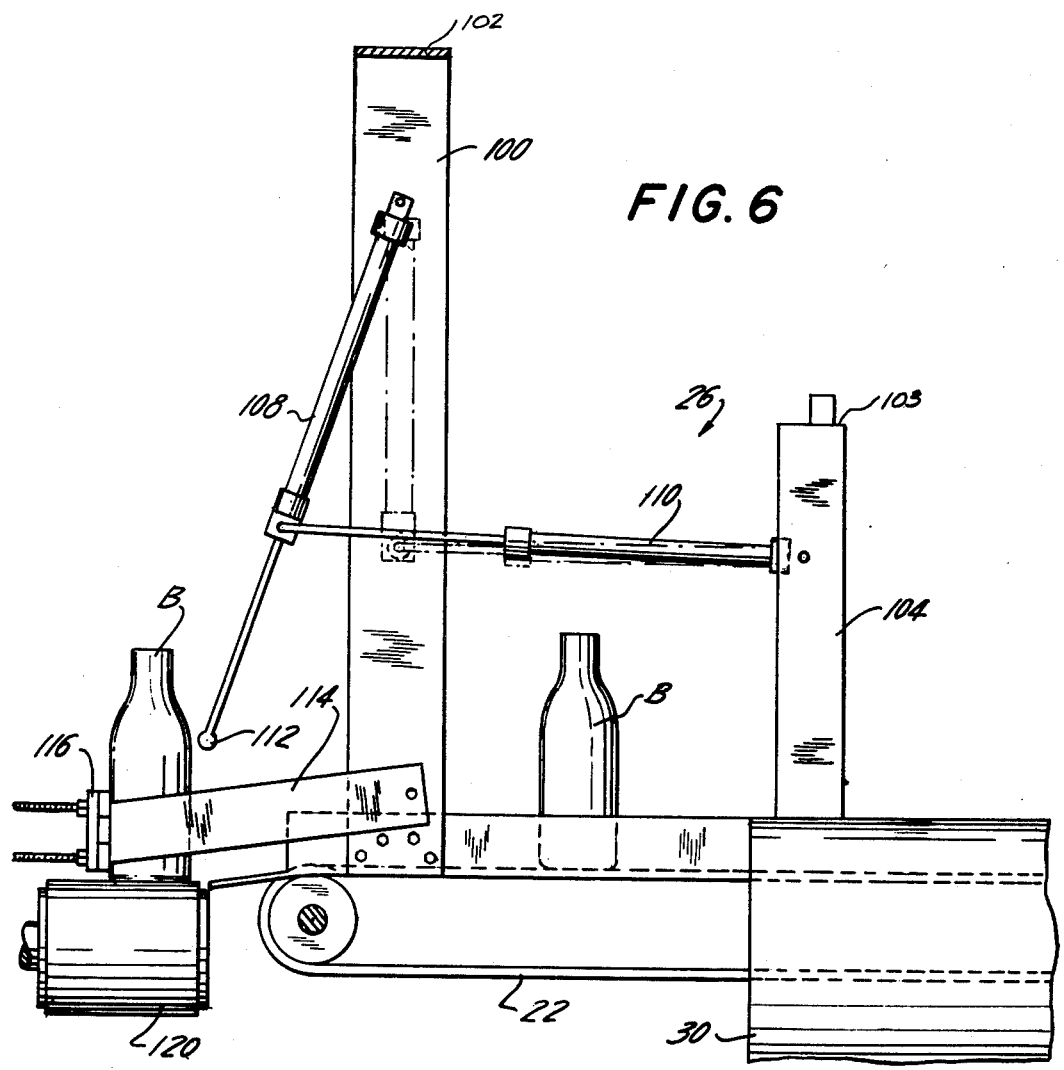
FIG. 6 is a side elevational view of the article ejector mechanism that removes coated ware from the curing oven conveyor.

Article ejector 26, best shown in FIGS. 6 and 7, accomplishes both functions and is uniquely designed to apply a cantilever-like force to bottles in order to free them from the conveyor. The ejector includes two pairs of opposed support members 100 and 104, respective ones of each pair positioned on opposite sides of the conveyor 22 and attached at their bottom ends to frame 30. Bridges 102 and 103 provide further support by attachment to the upper ends thereof. The principal ejector components are, however, a pair of vertically mounted fluid cylinders 108 pivotally attached to members 100 and a pair of horizontally mounted fluid cylinders 110 pivotally attached to members 104, both pairs of which are otherwise attached to and support knockout element 112.

In operation ejector cylinders 108 vertically displace knock-out member 112 to a position behind bottles B with respect to their direction of movement with conveyor 22. In the event a cantilever force is to be applied to the ware, the downward movement of element 112 is timed to assure engagement of the element with the bottle along its shoulder. This downward force will accordingly be partially transposed into a horizontal "tipping" force by the sloping bottle shoulder and the bottle bottom will be broken free from the conveyor. The element 112 will thereafter continue its downward movement until it is adjacent the bottle bottom and then fluid cylinders 110 will be activated thus propelling element 112 arcuately to a point removed from conveyor 22 (see FIG. 6). This motion or movement likewise moves the ware B off conveyor 22 under the influence of element 112 and in this instance against stop 116 and onto another single line cross conveyor 120.

Figure 13:
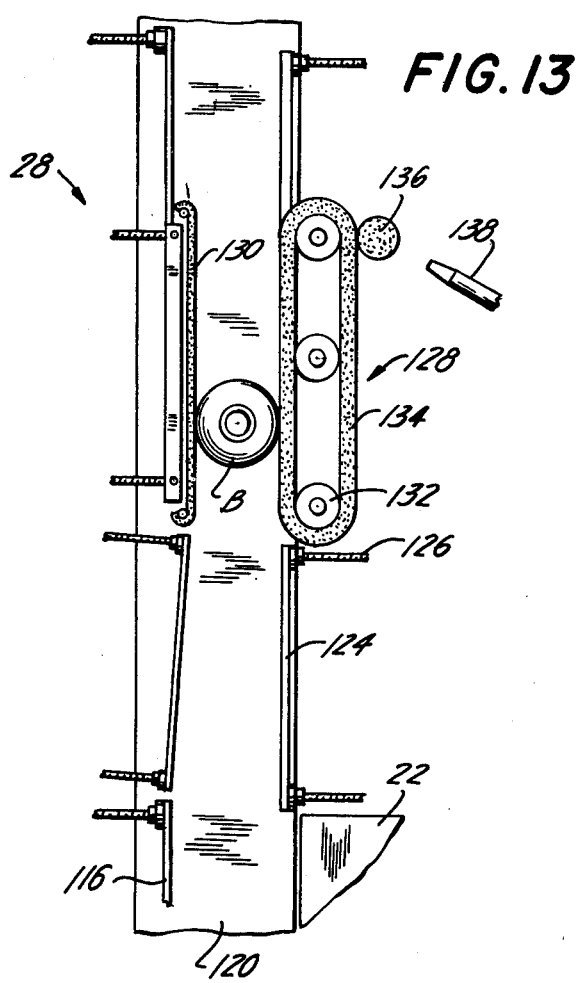
FIG. 13 is a top plan view of belt coater arrangement adapted to lubricate selected portions of polymer coated ware according to the invention.
Figure 14:
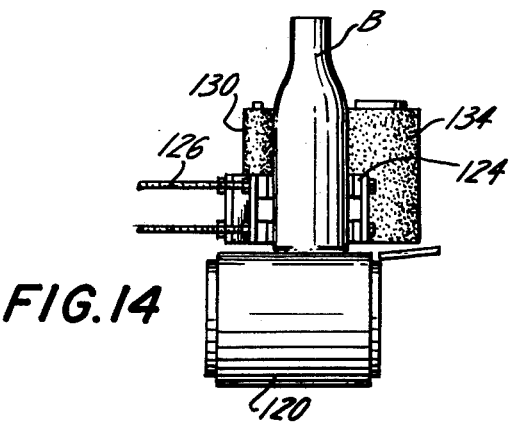
FIG. 14 is an end elevational view of the belt coater taken along line 14—14 of FIG. 13.

Conveyor 120 operates to pass the shatterproof ware through lubricating apparatus 28 and even perhaps through the flame treating process above mentioned. However, a suitable lubricant may be applied to the resin sheath using apparatus as is shown in FIGS. 13 and 14. Briefly note, though, that the ware is moved between guide rails 124 which are supported for movement by guide rail adjusting screws 126, into the roller coater 128. This is further comprised of a powered roller mounting system 132, a porous flexible belt 134 and a stationary belted back-up plate 130. As the bottle B engages belt 134 it is pressed against the back-up plate 130 and rotated therealong in response to the belt's motion. Likewise, at the same time, a lubricant sprayed onto applicator 136 by spray head 138 and thereafter transferred to the exterior of belt 134, is applied to resin coating surface pressed against that belt.

Figure 16:
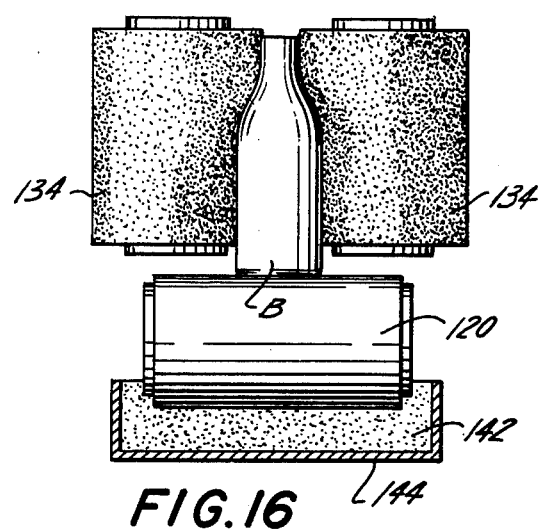
FIG. 16 is an end elevational view in partial cross section of the modified belt coater shown in FIG. 15 and taken along line 16—16.
Figure 15:
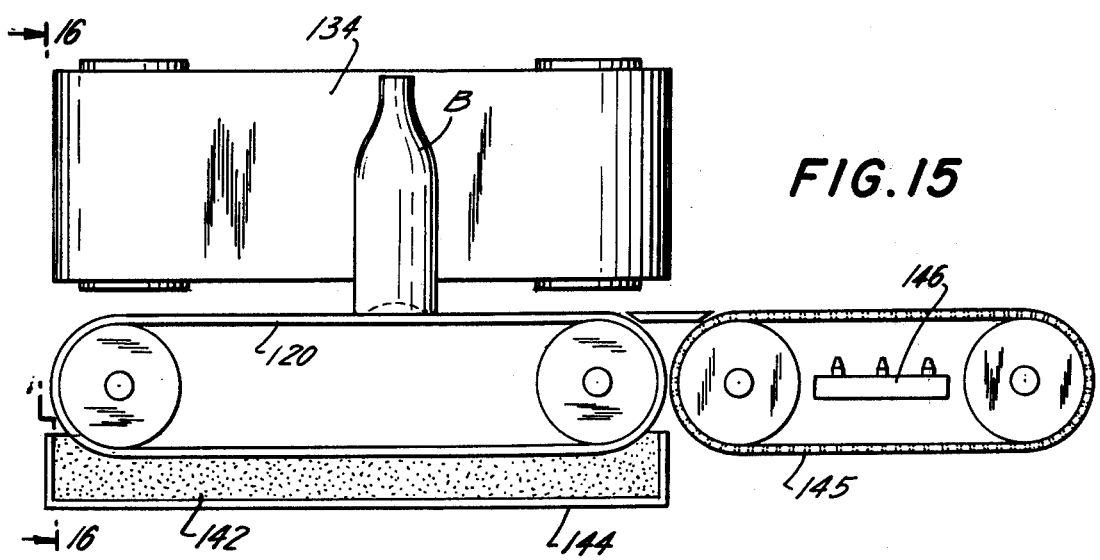
FIG. 15 is a side elevational view of modified belt coater shown in partial cross section and including applicator apparatus adapted to lubricate and/or embed particles on the underside of the bottle bottom.

It should be obvious that various modifications might be made to the lubrication device and one such alteration may be seen upon reference to FIGS. 15 and 16. Here, a dual powered belt and roller system is employed and the belt surfaces are seen to almost entirely encompass the bottles height. Additionally, conveyor 120 is altered to the extent that it is composed of several shorter conveyors one of which may itself be immersed in a lubricant 142 contained in receptacle 144. Similarly, another of these conveyor sections may incorporate a perforated belt as at 145 which will accommodate the passage of other atomized treating compounds upon the bottle bottoms as it is applied from spray unit 146. Likewise, it should be appreciated that this modified apparatus arrangement may be used to preheat and embed glass beads or the like into the polymer coating or the bottle bottom.

From the foregoing, it should be noted that a unique process and apparatus is employed in the production of shatterproof ware. These may, of course, be used in the preparation of such ware with minor modifications depending upon the circumstances encountered without departing from gist of the concepts herewith disclosed as well as those which may be considered inherent herein.

We claim:

1. Coating apparatus adapted for intermittent operation in handling a plurality of individual articles and comprising:
   a main supporting frame;
   a container positioned upon said frame and having a porous support member which retains a particulate coating material thereabove including means in communication therewith to fluidize said particulate material;
   a transfer mechanism attached to said frame for intermittent movement to a plurality of positions at least one of which is in juxtaposition with said container;
   a gripper device carried by said transfer mechanism for gripping said articles and securely holding same during the movement of the transfer mechanism to its said plurality of positions, said transfer mechanism including support bar means pivoted proximate one end thereof and connected to said gripper device proximate an opposing end, said support bar means being connected to a drive means for effecting said intermittent movement; and means to move said container into close communication with an article when the transfer mechanism is in juxtaposition with said container whereby the articles held by said gripper device come into contact with said particulate coating material.

2. A coating apparatus according to claim 1 wherein said gripper device further incorporates a conduit suitably arranged to convey a fluid medium to a point coincident with gripped articles and further adapted to place the interior of said articles under a positive pressure during the movement thereof.

* * * * *